(12) United States Patent
Clouthier et al.

(10) Patent No.: US 6,583,887 B1
(45) Date of Patent: Jun. 24, 2003

(54) METHOD AND APPARATUS FOR DATA COMPRESSION

(75) Inventors: Scott Clouthier, Boise, ID (US); Richard Benear, Boise, ID (US); Gregory S. Saathoff, Boise, ID (US); Jeffery M. Roberts, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/258,545

(22) Filed: Feb. 26, 1999

(51) Int. Cl.[7] .................................................. H04N 1/32
(52) U.S. Cl. .............................. 358/1.15; 358/426.01; 358/426.02; 358/426.03; 358/426.04; 358/426.05; 358/426.06; 358/426.07; 358/426.08; 358/426.09; 358/426.11; 358/426.1; 358/426.12; 358/426.13; 358/426.14; 358/426.15; 358/426.16; 382/232
(58) Field of Search .................. 358/426.01, 426.02, 358/426.03, 426.04, 426.05, 426.06, 426.07, 426.08, 426.09, 426.11, 426.1, 426.12, 426.13, 426.14, 426.15, 426.16; 382/232

(56) References Cited

U.S. PATENT DOCUMENTS

| | | | | |
|---|---|---|---|---|
| 5,045,852 A | * | 9/1991 | Mitchell et al. | 341/51 |
| 5,276,898 A | * | 1/1994 | Kiel et al. | 709/105 |
| 5,374,916 A | * | 12/1994 | Chu | 340/146.2 |
| 5,394,534 A | * | 2/1995 | Kulakowski et al. | 711/112 |
| 5,479,587 A | * | 12/1995 | Campbell et al. | 358/1.11 |
| 5,771,340 A | * | 6/1998 | Nakazato et al. | 358/1.13 |
| 5,982,937 A | * | 11/1999 | Accad | 382/166 |
| 6,208,273 B1 | * | 3/2001 | Dye et al. | 341/51 |
| 6,337,747 B1 | * | 1/2002 | Rosenthal | 358/1.15 |
| 6,381,368 B1 | * | 4/2002 | Kanatsu | 341/51 |

* cited by examiner

Primary Examiner—Edward Coles
Assistant Examiner—Ashanti Ghee
(74) Attorney, Agent, or Firm—Matthew L. Wade

(57) ABSTRACT

Compression apparatus is described that operates to select an optimum compression procedure to apply to received image data. The compression apparatus can be employed in a page printer having a print engine that must be provided with video data at a constant rate in order to avoid a print underrun. The page printer operates to receive print data and to convert the received print data into rasterized page strips. Some or all of these rasteized page strips can then be compressed by the compression apparatus for later conversion to video data. The compression apparatus operates to compress each received rasterized page strip by selecting a compression procedure that results in a compressed strip that will provide optimum print quality while not causing a print underrun and that is below a threshold data size.

4 Claims, 4 Drawing Sheets

METHOD AND APPARATUS FOR DATA COMPRESSION

FIELD OF THE INVENTION

This invention relates in general to memory management and, more particularly, to printer memory management.

BACKGROUND OF THE INVENTION

For purposes of this application, the phrase "print data" refers to data that a printer receives from a host that describes the page or pages that are to be printed. Thus print data is representative of an image that is to be printed. Print data could be, for example, in printer control language (PCL), PostScript [PostScript is a trademark of Adobe Systems Incorporated.] or even raster data. It is further noted that the phrase "video data" refers herein to data that is ready to be transferred to a print engine so as to cause the print engine to form an image on a page.

It is well known that laser print engines typically operate at a constant speed. If new video data is not available at a rate that keeps up with the operation of the print engine, the page is not printed. This condition is sometimes referred to as a print "underrun" condition or alternatively as a print "overrun" condition.

One technique for preventing print underruns is to convert received print data into a full page of raster data that can quickly be converted (if necessary) to video data. This technique ensures that video data will always be ready for the print engine. Unfortunately, printers that use this technique can require a large amount of raster memory which can increase the cost of the printer. For example, consider a laser printer that is able to print 24-bit color Red-Blue-Green (RGB) images at 600 dot-per-inch (DPI) resolution. In order to store a full page of raster data representative of such an image, over 96 Mbytes of raster memory is required.

In order to reduce printer cost, substantial efforts have been directed towards developing improved techniques that can be used to reduce the need for raster memory in a printer without creating print underrun conditions. One of these techniques involves first converting received print data into a list of commands, called a display list. The display list typically requires a small amount of memory space to represent an image that is to be printed on a page. The list of commands forming the display list are then sorted according to their vertical position on the page. The sorted display list is then divided into sections called "page strips". Each page strip is representative of a portion of the image that is to be printed. The page strips can then be selectively rasterized and then stored into memory. For example, particular page strips that are determined to have an unacceptable rasterization execution time can be rasterized and stored prior to starting the print engine in order to prevent print underruns. An example of this type of technique is described in U.S. Pat. No. 5,129,049 entitled "Method and Apparatus for Preventing Print Overruns". That patent is incorporated herein by reference.

In order to further reduce the need for printer memory, some or all of the page strips after rasterization can be compressed and then stored into memory. One technique that can be used to compress rasterized page strips can be found in U.S. Pat. No. 5,479,587 entitled "Page Printer Having Adaptive Data Compression for Memory Minimization", issued to Campbell et al. That patent is incorporated herein by reference. In Campbell, one of a number of lossless and lossy compression procedures are selected to compress a rasterized page strip in order to make optimal use of available printer memory.

It can be seen that a compressed page strip can require additional time for conversion to video data during a printing operation. This is due to the additional time required to decompress the compressed page strip prior to its conversion to video data. In order to prevent print underruns, this additional time must be taken into account. This issue is addressed in the application entitled "Balancing Compressed Storage Requirements with Decompression Times during Punt Protection Processing in a Page Printer", filed Oct. 29, 1998 and having application Ser. No. 09/175903. That application is incorporated by reference. Improved techniques are needed, however, to ensure optimized print quality, optimum use of printer memory, and that print underruns are prevented.

SUMMARY OF THE INVENTION

A system is described for transmitting video data at a pre-determined rate to a marking engine. The system includes a source for supplying uncompressed data that is representative of a plurality of sub_line units in an image, a memory, a first compressor, a second compressor, an analyzer and a video generator. The fist compressor is operable, upon being enabled, to receive the uncompressed data and to apply a first compression procedure to the uncompressed data so as to generate a first compressed data and to write the first compressed data into the memory. The second compressor is operable, upon being enabled, to apply a second compression procedure to the uncompressed data so as to generate a second compressed data and to write the second compressed data into the memory. The analyzer operates to determine if the first compressed data includes a local compression ratio associated with at least one sub_line unit from the plurality of sub_line units being below a threshold local compression ratio and if so, to enable the second compressor thereby causing the second compressor to generate the second compressed data and to write the second compressed data into the memory as a final compressed form. The video generator is operable to retrieve the final compressed form from the memory and to convert the final compressed form into the video data and to transmit the video data to the print engine at the pre-determined rate.

A method of converting uncompressed data representative of a plurality of sub_line units into a final compressed form and of writing the final compressed form into a memory. The method includes the steps of: applying a first lossless compression procedure to at least a portion of the uncompressed data to produce a first compressed data; and determining if the first compressed data includes a local compression ratio associated with at least one sub_line unit from the plurality of sub_line units below a threshold local compression ratio, and if so applying at least one other second compression procedure to the first data so as to convert the first data into a second compressed data and writing the second compressed data as the final compressed form into the memory.

DETAILED DESCRIPTION OF THE INVENTION

For ease of discussion, a compressed rasterized page strip is referred to herein as a "compressed strip". In addition, a compressed strip generated by a lossless compression procedure is alternatively referred to as a "lossless compressed strip". Likewise, a compressed strip generated by a lossy compression procedure is alternatively referred to as a "lossy compressed strip".

It is well known that many image forming devices (a laser print engine or a display device) operate to form an image onto a media (such as a page or a CRT) by placing marks on the media one line at a time. For purposes of this discussion, a portion of a line used to form an image is referred to herein as a "sub_line unit". The "length" of the sub_line unit refers to the number of pixels in the image data that is used to represent the sub_line unit. Thus, it can be seen that data representative of an image can also be considered representative of a series of sub_line units (of the same or varying lengths) that are used to form the image. The "local compression ratio" of a sub_line unit refers herein to the compression ratio of pixel data, when compressed, that is representative of the sub_line unit. Similarly, the local compression ratio of a pixel refers to the compression ratio of the pixel data, when compressed, that is representative of the pixel.

Figure 1:
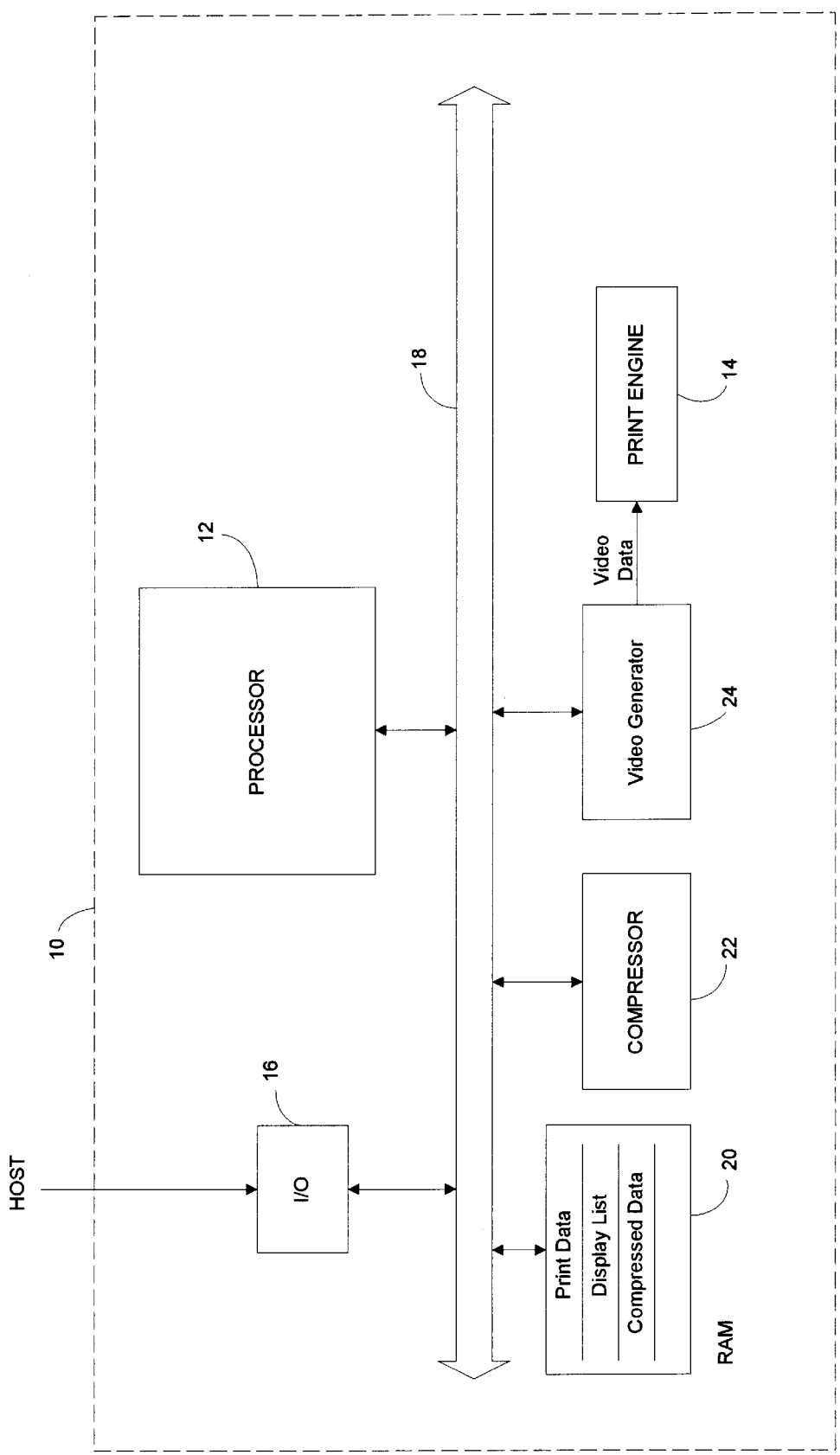
FIG. 1 is a high level functional block hardware diagram of a printer incorporating the present invention.

Referring to FIG. 1, Printer 10 includes an Input/Output (I/O) Port 16, Processor 12, Random Access Memory (RAM) 20, Raster Data Compression Apparatus (Compressor) 22 and a Raster Data Decompressor and Video Data Generator (Video Generator) 24 all connected by a Bus 18. Printer 10 further includes a Print Engine 14. Print Engine 14 is a laser printer which, during a print operation, runs at a constant speed and must be provided with video data at a constant rate referred to herein as the "print engine data rate". In this example, it is assumed that Print Engine 14 is a color laser print engine, however in other embodiments the print engine could be a monochrome laser print engine.

Basic control functionality of Printer 10 is provided by Processor 12 which can include one or more microprocessors and memory devices for storage of various control routines. Printer 10, in this example, receives print data from a host via I/O 16. When the print data is received it is read into RAM 20 and is then converted, using standard techniques, to a display list. The display list is then stored into RAM 20. After or during the generation of a display list, page strips are identified and some or all of these page strips can be rasterized prior to the start of a print operation. Rasterization is performed by rendering facilities provided by Processor 12 and can be accomplished using standard techniques. After a page strip is rasterized, it can then be compressed by operation of Compressor 22. As will be discussed in greater detail below, Compressor 22 operates to convert a received rasterized page strip selectively into either a lossless compressed strip or a lossy compressed strip and to then store the compressed strip into RAM 20. It is noted that the decision to rasterize a page strip and whether to compress a rasterized page strip can be made using techniques such as that described in U.S. Pat. No. 5,129,049 (mentioned above). In this embodiment, for example, whether or not a rasterized page strip is compressed is based upon presently available memory resources in RAM 20.

Figure 2:
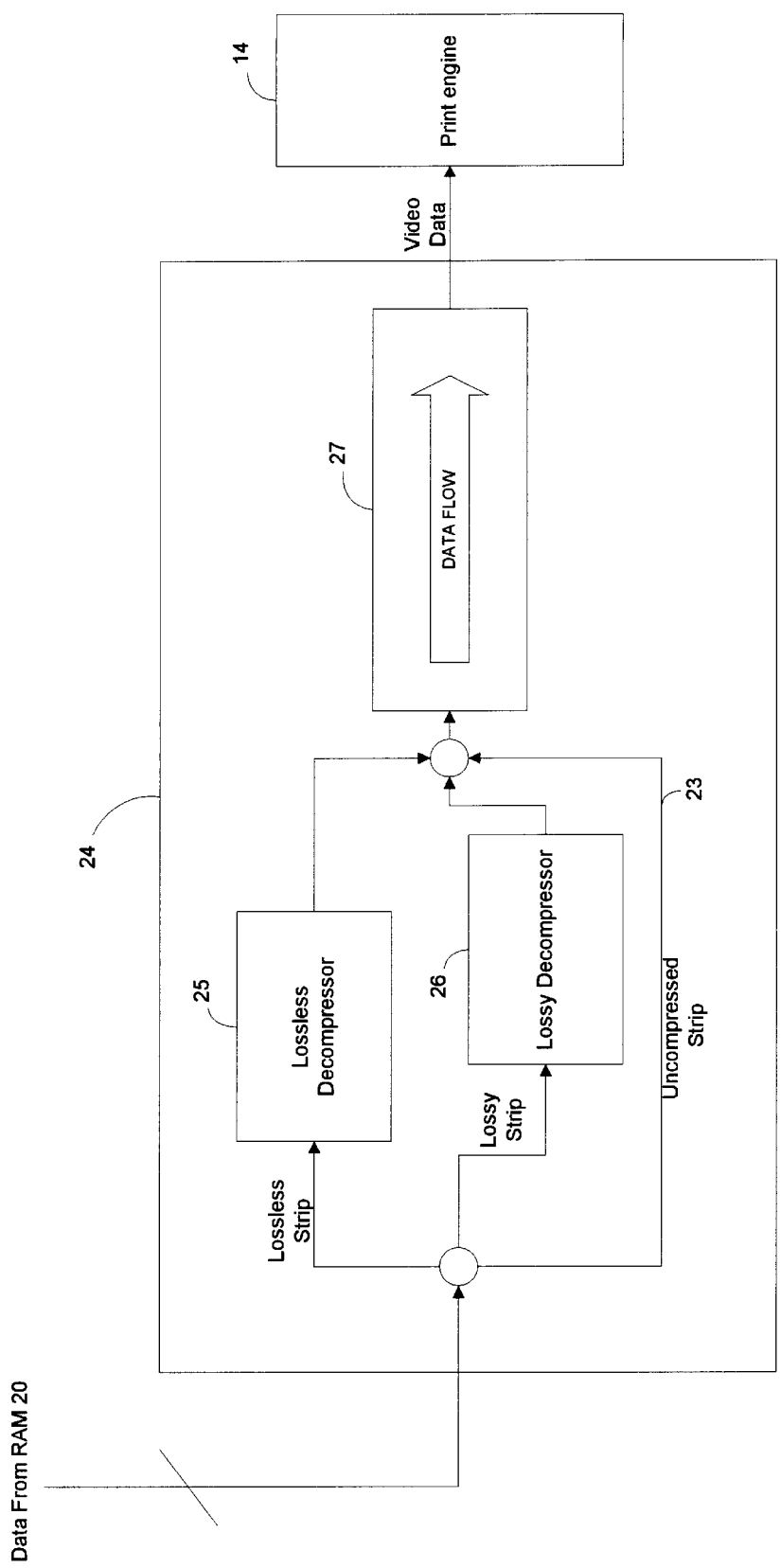
FIG. 2 is a simplified functional block diagram of a device that converts compressed raster data into video data, useful to understand one aspect of the present invention

During a print operation, strip data (i.e., either an uncompressed page strip or a compressed strip) is transmitted (when needed) from RAM 20 to Video Generator 24. Video Generator 24 operates to convert the received strip into video data and to transmit the video data to Print Engine 14. Referring now to FIG. 2, a simplified functional block diagram of Video Generator 24 is depicted. Video Generator 24 includes a series of functional units that are used to convert rasterized data (alternatively referred to as "pixel data") into video data and to transmit this video data to Print Engine 14. These functional units are generally represented by Data Pipeline 27. In this embodiment, for example, Data Pipeline 27 includes a color space convertor for performing a color space conversion and line buffers for buffering data for transmittal to Print Engine 14. It is important to note that if the pixel data transfer rate to Data Pipeline 27 is not adequate a print underrun can occur.

Video Generator 24 further includes Lossless Decompressor 25, Lossy Decompressor 26 and Bypass Channel 23. In general, when a compressed strip is transmitted to Video Generator 24, it is received into either Lossless Decompressor 25 (if the compressed strip is a lossless compressed strip) or into Lossy Decompressor 26 (if the compressed strip is a lossy compressed strip). In either case, pixels are decompressed and transmitted to Data Pipeline 27 for conversion to video data. In addition, when an uncompressed strip is transmitted to Video Generator 24, it is received directly into Data Pipeline 27 for conversion to video data via Bypass Channel 23.

When a lossless compressed strip is received by Lossless Decompressor 25, each line represented in the lossless compressed strip is reconstructed pixel by pixel. Each pixel is transmitted (after being decompressed) in series to Data Pipeline 27. The rate at which a pixel can be decompressed (i.e., its decompression rate) is dependant upon the amount of compressed data (representative of the pixel) that Lossless Decompressor 25 must process and the response time of Lossless Decompressor 25. It can be seen that the amount of data that Lossless Decompressor 25 must process to decompress a pixel is indicated by that pixel's local compression ratio. In addition, the pixel's local compression ratio can also be used to indicate its worst case decompression rate if the worst case response time of Lossless Decompressor 25 is known. It also follows that the worst case decompression rate of a series of pixels, defining a sub_line unit, can also be indicated by the local compression ratio of that sub_line unit if the worst case response time of Lossless Decompressor 25 is known.

During the conversion of a lossless compressed strip to video data, the variability in pixel decompression rates can result in variability of the pixel data transfer rate into Data Pipeline 27. In order to average out the variability in the pixel data transfer rates, Data Pipeline 27 includes one or more line buffers. These buffers only provide limited protection as only a single line is buffered at any one time. As a result, a print underrun can occur if the pixel data transfer rate into Data Pipeline 27 drops below certain limits. These limits can be characterized by simple tests or by a queuing theory analysis or both. In addition, these limits can be used to define minimum decompression rates of pre-defined sub_line units in a lossless compressed strip. In the present embodiment, for example, testing has shown that if the decompression rate of each sub_line unit of a certain length (referred to herein as a test sub_line unit) in a lossless compressed strip is maintained at a certain threshold decompression rate that a print underrun will not occur. (i.e., the pixel data transfer rate will always be maintained at an adequate level). In addition, testing has also determined that under Lossless Decompressor 25 worst case response time conditions, the decompression rate of each test sub_line unit in a lossless compressed strip will be above the threshold decompression rate (i.e., a print underrun will not occur) if the local compression ratio of each sub_line unit is above a threshold local compression ratio.

As will be explained in greater detail below, lossy compressed strips are generated by Compressor 22 in accordance with the JPEG standard (details regarding the JPEG standard can be found in "JPEG Still Image Data Compression Standard" by Pennebaker et al., ISBN 0-442-01272-1). In accordance with the JPEG standard, when a lossy compressed strip is received by Lossy Decompressor 26, pixels are reconstructed in units of 8 by 8 blocks (i.e., 8 lines are reconstructed in parallel). Data Pipeline 27 is adapted to receive these blocks of data and to buffer appropriately the pixel data which are not associated with the line that is presently being printed. As a result, typically multiple lines of pixel data are buffered in Data Pipeline 27 during the decompression and printing of a lossy compressed strip. This provides a large amount of protection to any variability in pixel data transfer rate between Lossy Decompressor 26 and Data Pipeline 27. As a result of this, it is assumed that a lossy compressed strip will not cause a print underrun.

Figure 3:
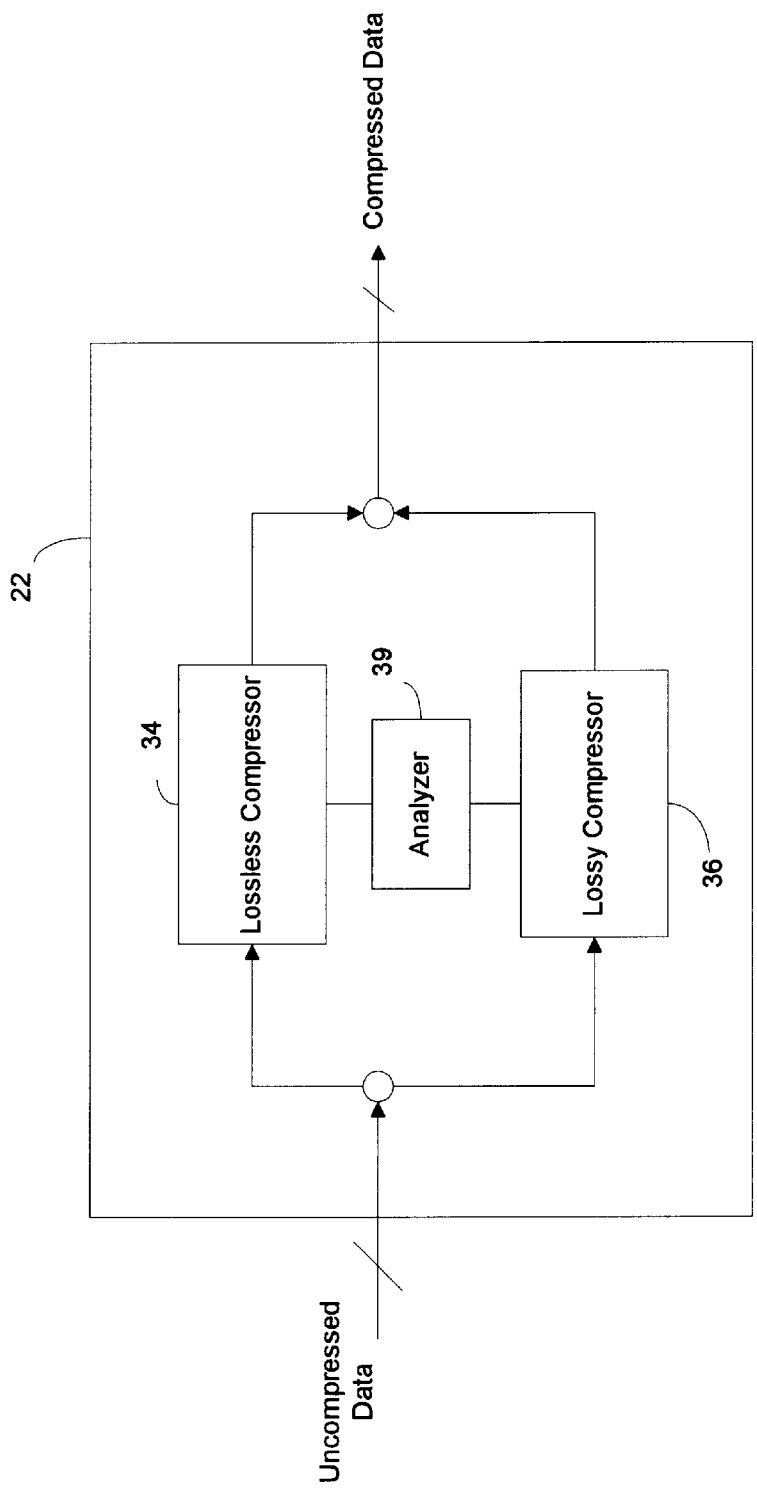
FIG. 3 is a functional block diagram of compression apparatus that operates according to the inventive aspects of the present invention.

Turning now to FIG. 3, a high level functional block diagram of Compressor 22 is depicted. As shown, Compressor 22 includes a Lossless Compressor 34 and a Lossy Compressor 36 both under the control of local compression ratio analyzer (Analyzer) 39. As will be understood by a person skilled in the art, the functions of these components can be performed by a number of devices. For example, these functions can be performed by one or more state machines, or by one or more microprocessors under the direction of software routines, or a combination of one or more state machines and one or more microprocessors under direction of software routines.

Lossless Compressor 34, when enabled by Analyzer 39, operates to perform read operations upon RAM 20 so as to read a rasterized strip (referred to as the "targeted strip") that has been identified for compression. As this data is received, it is converted into lossless compressed data and written into an allocated storage area (referred to as the "temporary buffer") in RAM 20 so as to generate a lossless compressed strip. Although it is understood that any number of lossless compression procedures can be used to practice the present invention, Lossless Compressor 34 employs a Lempel-Ziv (LZ) procedure to convert the received data into lossless compressed data [Details regarding the LZ procedure can be found in U.S. Pat. No. 5,455,576 entitled "Apparatus and Method for Lempel-Ziv Data Compression with Improved Management of Multiple Dictionaries in Content Addressable Memory. That patent is incorporated herein by reference.]. In addition, Lossy Compressor 36, when enabled by Analyzer 39, operates to perform read operations upon RAM 20 so as to read the targeted strip. As this data is received, it is converted into lossy compressed data and written into the temporary buffer so as to generate a lossy compressed strip. As previously indicated, in the present embodiment a JPEG compression procedure is used by Lossy Compressor 36 to convert received data into lossy compressed data. It is noted, however, that any number of lossy compression procedures can be used to practice the present invention.

In general, Compressor 22 operates to select the compression procedure that results in a compressed strip that provides the optimum print quality while meeting the following two criteria:

1. a print underrun will not occur from the compressed strip; and
2. the compressed strip data size is below a threshold data sized based upon available storage area(s) in RAM 20.

As previously noted, it is assumed that a lossy compressed strip will not cause a print underrun. Furthermore, as will be described in detail below, the JPEG compression procedure also guarantees that each lossy compressed strip is below the threshold data size.

As is known in the art, a JPEG lossy compression procedure can result in image degradation due to loss of data. In order to ensure optimum print quality, therefore, Compressor 22 first determines if the lossless compression procedure can be used to generate a compressed strip that will not cause a print underrun and is below the threshold data size. To make this determination, Analyzer 39 enables lossless Compressor 34 so as to first convert the targeted strip into a lossless compressed strip. As previously indicated, this is accomplished in part by Lossless Compressor 34 performing a series of read operations upon RAM 20 (so as to read the targeted strip) and a series of write operations to the temporary buffer (so as to write the resulting lossless compressed data and thereby build the lossless compressed strip). As a result, two data streams are created- the first is the "uncompressed data stream" that is associated with Lossless Compressor 34 reading the targeted strip. The second data stream is the "compressed data stream" that is associated with writing the compressed data to the temporary buffer.

As Lossless Compressor 34 performs these read and write operations, Analyzer 39 determines if the resulting lossless compressed strip includes a local compression ratio associated with a test sub_line unit that is below the threshold local compression ratio. As indicated above, this condition indicates that the lossless compressed strip could cause a print overrun. In this embodiment, Analyzer 39 makes this determination by identifying each interval of read operations that is associated with reading a test sub_line unit. During each of these read intervals, Analyzer 39 counts the number of write operations that occur and determines if this number is above a threshold number. Via knowledge of the response time of Lossless Compressor 34, it is known that if the number of write operations that occur during a read interval is above a threshold number, then the local compression ratio of the test sub_line unit associated with that read interval is below (or at least could be below) the threshold local compression ratio. As a result, a print underrun could occur from the resulting lossless compressed strip. If Analyzer 39 does not detect the occurrence of this condition (referred to as the "underrun condition") after the lossless compressed strip has been written to the temporary buffer, a check is then made as to whether the lossless compressed strip data size is above the threshold data size. If Analyzer 39 then determines that the lossless compressed strip is not above the threshold data size, then the lossless compressed strip is moved into a permanent location in RAM 20 (referred to herein as the "permanent buffer") for storage of compressed strips (in a final compressed form) and the compression operation is ended.

If, however, it is determined that an underrun condition exists or that the lossless compressed strip is above the threshold data size, Analyzer 39 then enables Lossy Compressor 36. After being enabled, Lossy Compressor 36 operates to perform a multi-pass procedure in order to efficiently determine a Quantization factor (Q-factor) that can be used upon the targeted strip so as to yield a lossy compressed strip that is below the threshold strip buffer size. As is well known in the art, the Q-factor is a single user-selectable parameter provided by the JPEG standard that controls the quality of the compressed image, and, indirectly the compression ratio. Specifically, it is the parameter that scales up or down the quantization levels for the Discrete Cosine Transform (DCT) coefficients which are stored in a matrix known as the Q-table. In general, the multi-pass procedure provides a JPEG compliant compression scheme for adjusting the value of the Q-factor in the JPEG algorithm so that an arbitrary raserized strip is compressed to below a pre-determined data size. It is noted that one advantage of this technique is that Lossy Decompressor 26 (FIG. 2) can apply a standard JPEG compliant decoding procedure to decompress the lossy compressed strip.

When Lossy Compressor 36 is enabled, Lossy Compressor 36 performs a series of read operations upon RAM 20 (so as to re-read the targeted strip). As this data is received, it is converted into lossy compressed data by applying a JPEG compression procedure using a minimum Q-factor (Q_min). As the received data is JPEG compressed using Q_min, the resulting first pass lossy compressed data is written into the temporary buffer, thereby overwriting the lossless compressed data with lossy compressed data. After the lossy compressed strip is created via this first pass, Analyzer 39 then checks to determine if the first pass lossy compressed strip data size is above the threshold data size. If not, then the first pass lossy compressed strip is moved into the permanent buffer as the final compressed form and the compression operation is ended.

If, however, the lossy compressed strip data size is determined to be above the threshold data size, then a new Q-factor (Q_new) is computed based upon a mathematical model. The targeted strip is then re-read (second pass) from RAM 20. As the data is read by Lossy Compressor 36, it is JPEG compressed using Q_new. The resulting second pass lossy compressed data is written into the temporary buffer thereby overwriting the first pass lossy compressed strip. After the second pass lossy compressed strip is written into the temporary buffer, Analyzer 39 then checks if its data size is above the threshold data size. If not, then the second pass lossy compressed strip is moved into the permanent buffer as the final compressed form and the compression operation is ended.

If, however, the second pass lossy compressed strip is determined to be above the threshold data size, then a final pre-determined Q-factor, (Q_DC) is used to JPEG compress the targeted strip. In this embodiment, the Q_DC factor is such that only the DC component of the DCT coefficients remains after quantization (i.e., the rest of the frequency coefficients are discarded). As a result, each 8×8 block of pixels data from the targeted strip is only represented in the lossy compressed strip by its DC frequency component. As a result, the data size of the third pass lossy compressed strip is assumed to be below the threshold data size. The third pass lossy compressed strip can be written into the temporary buffer and then moved into the permanent buffer, or alternatively can be written directly into the permanent buffer as the final compressed form. After the third pass lossy compressed strip is written into the permanent buffer, the compression operation is complete.

It is noted that in the present embodiment, Q_min, the mathematical model for obtaining Q_new and Q_DC are obtained by experimental methods. For example, during the development of Printer 10, a set of test image files are determined. These test image files (test files) are representative of the range of expected image data that Printer 10 is expected to handle in the marketplace. These test files are then JPEG compressed using a series of Q factors. After each test file is compressed, its compressed data size is determined then decompressed and printed. The quality level of the printed output is determined. Q_min is derived from these tests by determining one Q factor from the series of Q_factors that provides a certain range of compression ratios while providing a first subjective level of print quality.

After Q_min is determined, the compression ratio of each test file as compressed using Q_min is recorded. A Q_new is then determined for each of these compression ratios that provides a higher level of compression while still providing a second subjective level of print quality. The Q_new and associated compression ratio can then be plotted, as a series of sample points along an X and Y axis. The mathematical model can then be derived by doing a least-squares fit analysis through these points.

In the embodiment just described, the threshold local compression ratio was determined based upon a worst case response time analysis of Lossless Decompressor 25. It is noted that in other embodiments, the response time of the Lossless Decompressor can be further characterized and related to various load conditions that can occur during a printing operation. A threshold local compression ratio can then be determined for each of these load conditions. Before or during the lossless compression of a targeted strip, the analyzer is adapted to check the current load condition of Load Decompressor 25 and the threshold local compression ratio is modified accordingly.

As previously indicated and as reemphasized here, the present invention can be practiced with any number of lossless and lossy compression procedures. For example, a Wavelet Transform and Vector Quantization (WTVQ) procedure or a Vector Quantization (VQ) procedure could be used in place of, or in addition to, the JPEG lossy compression procedure described above.

In addition, in the embodiment just described only one lossless compression procedure is tested before applying a lossless compression procedure to the targeted strip. In other embodiments, other lossless compression procedures are also tested in a similar manner prior to using one or more lossy compression procedures.

It is further noted that in other embodiments, before a targeted strip is compressed a determination is made as to its data type in order to ascertain whether a lossless compression should be tried. For example, if the targeted strip is determined to consist of text or line art, then the strip is lossless compressed and tested as described above to determine if a lossy compression operation should then be applied. If, however, the targeted strip is determined to represent a natural image, such as a portion of a scanned photograph, then it is assumed that the targeted strip will likely not lossless compress below the threshold data size. As a result, this type of targeted strip is sent directly to the lossy compressor and the lossless compressor is bypassed. In this manner, a lossless compression procedure is applied to targeted strips which are not likely to lossless compress below the threshold data size. In this manner, the efficiency of the compression operation can be improved.

It is noted that certain techniques for testing the data type in a targeted strip may not be completely reliable. For example, the particular test used may indicate some targeted strips will not lossless compress below the threshold data size, when in fact they will. In this case, it can be desirable to first apply a single pass lossy compression procedure to the targeted strip identified by such a test. If the resulting lossy compressed strip is not below the threshold data size a lossless compression procedure is then tried in an attempt to preserve image quality. If the lossless compression procedure also fails, then the lossy compressor applies a multi-pass lossy compression procedure (such as the one described above) to the targeted strip. This last lossy compression procedure guarantees that the targeted strip is compressed below the threshold data size.

As just discussed, the present invention provides a novel compression technique that can be used in page printers to provide optimized print-output quality and memory management while preventing print underruns.

Figure 4:
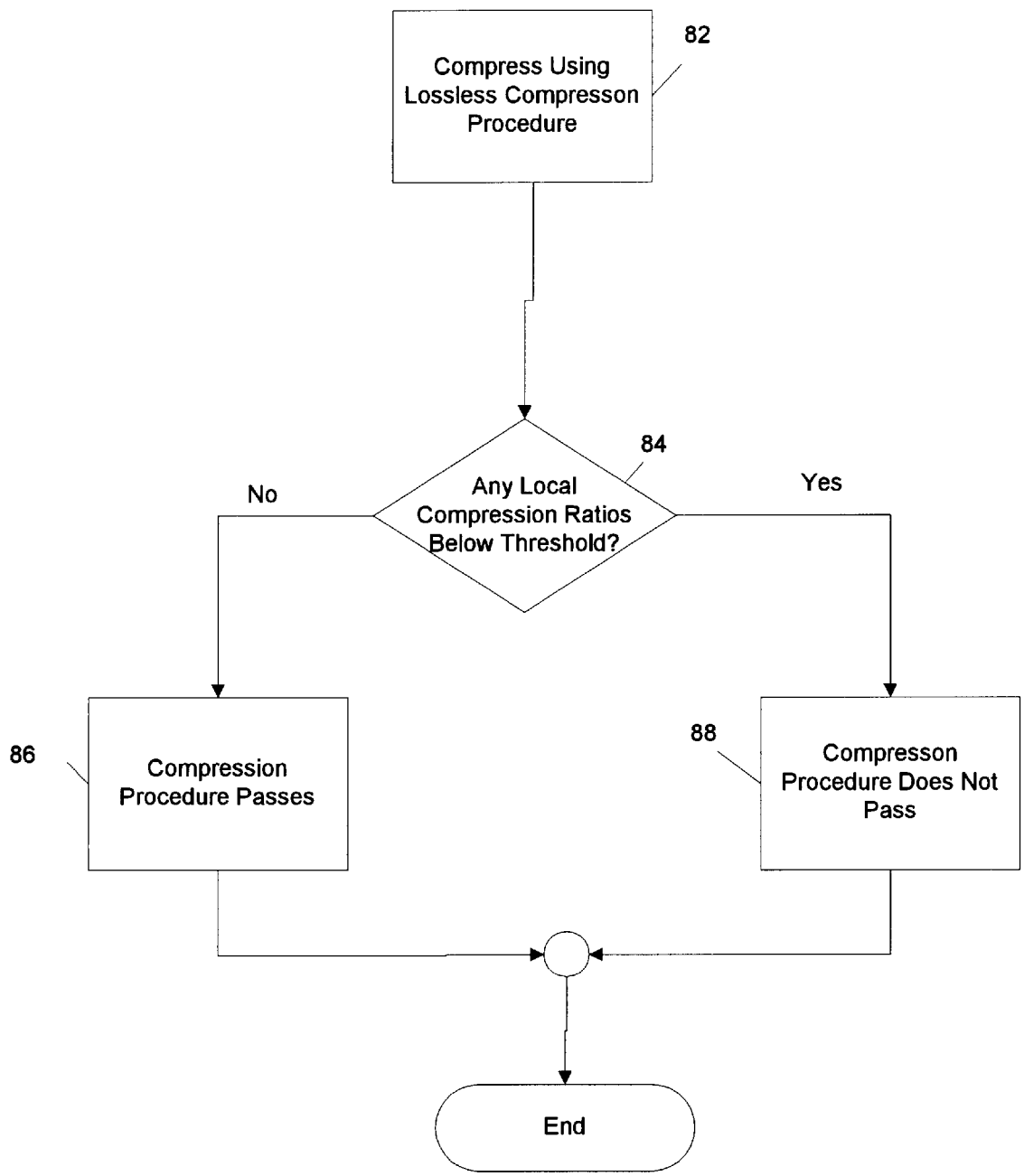
FIG. 4 is a flow diagram illustrating steps that can be followed to determine if a particular lossless compression procedure should be used to compress image data in accordance with the present invention.

It can be seen, however, that the present invention can be used in compression apparatus in other types of systems wherein it is desirable to ensure the compression procedure used upon received data will decompress properly. For example, FIG. 4 depicts a flow diagram illustrating steps that can be followed by compression apparatus to determine if a particular lossless compression procedure can be applied to compress image data. The image data is representative of a series of one or more sub_line units of the same or varying lengths that form the image. In this embodiment, it is assumed that each sub_line unit will decompress at the desired rate if its local compression ratio is above an associated threshold local compression ratio. In this embodiment, the compressor first compresses the image data using the lossless compression procedure that is being tested (step 82). During or after compression, it is determined if any of the local compression ratios in the compressed data associated with a sub_line unit is below the appropriate threshold local compression ratio (step 84). If not, it is determined that the lossless compressed data will decompress at the desired rate (step 86). The lossless compressed data can then be further tested (if required) for other characteristics to determine if the lossless compressed data is acceptable. If, however, any of the local compression ratios are determined to be below the threshold local compression ratio, that it is determined that the lossless compressed data will not decompress appropriately (step 88) and appropriate action is taken. For example, a different compression procedure can then be used to compress the data.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method, comprising:

applying a first compression procedure to image data so as to produce first compressed data;

determining if a different compression procedure should be applied to the image data, and if so then applying the different compression procedure to the image data so as to produce second compressed data and writing the second compressed data, as a final compressed form, to a memory;

wherein the determining step concludes that the different compression procedure should be applied if the image data includes a local compression ratio, associated with a sub-line of an image, that is below a threshold, and wherein the determining step concludes that the different compression procedure should be applied if the first compressed data is above a threshold data size.

2. The method of claim 1, wherein said method is performed by a laser printer.

3. The method of claim 1, wherein said different compression procedure includes a multi-pass lossy compression procedure that ensures said second compressed data is at or below said threshold data size.

4. The method of claim 3, wherein said threshold data size based upon size of available storage areas in said memory.

* * * * *